United States Patent [19]

Füllemann

[11] Patent Number: 4,900,524

[45] Date of Patent: Feb. 13, 1990

[54] METHOD FOR SEPARATION OF SULFUR DIOXIDE FROM GASES

[75] Inventor: Jörg Füllemann, Mastrils, Switzerland

[73] Assignee: VTH AG Verfahrenstechnik für Heizung, Vaduz, Switzerland

[21] Appl. No.: 206,204

[22] Filed: Jun. 13, 1988

[30] Foreign Application Priority Data

Jun. 29, 1987 [CH] Switzerland ............... 2 440/87-4

[51] Int. Cl.$^4$ ............................................. G01B 17/00
[52] U.S. Cl. ................................ 423/242; 423/512 A
[58] Field of Search ............... 423/242 A, 243, 512 A

[56] References Cited

U.S. PATENT DOCUMENTS

| | | | |
|---|---|---|---|
| 2,090,143 | 8/1937 | Nonhebel et al. | 423/242 |
| 4,618,482 | 10/1986 | Shinoita et al. | 423/242 |
| 4,686,940 | 7/1985 | Fullemann | 122/31 R |

FOREIGN PATENT DOCUMENTS

| | | | |
|---|---|---|---|
| 0118017 | 9/1984 | European Pat. Off. | |
| 162536 | 11/1985 | European Pat. Off. | |
| 0172375 | 2/1986 | European Pat. Off. | |
| 3136155 | 4/1982 | Fed. Rep. of Germany | |
| 3312388 | 10/1983 | Fed. Rep. of Germany | |
| 2131486 | 6/1984 | United Kingdom | |
| 2131715 | 6/1984 | United Kingdom | 423/242 |

OTHER PUBLICATIONS

Technische Rundschau Sulzer (Technical Review Sulzer), Jan., 1987, pg. 22, Article by Gage et al., "Rauchgasent-Schwefelung, Recyclingverfabren" (Flue GAs Desulfurization According to the Attisholz-Sulzer Recycling Process).
Article in the Swiss Technological University Catalog No. B 18 655; 1979/2, "Contribution to Environmental Protection, Food Matters and Veternary Administration", Fed. Ministry for Heath and Environmental Protection), pp. 14-19.

*Primary Examiner*—Gregory A. Heller
*Attorney, Agent, or Firm*—Frishauf, Holtz, Goodman & Woodward

[57] ABSTRACT

To prevent the formation of encrustations on a pH sensor in a combustion exhaust or flue gas washing apparatus, alkaline additives are added to the wash water which, upon contacting SO$_2$ in the gases, form sulfite particles. The sulfite particles are prevented from depositing at the bottom of a collection vessel (11) in form of a mud, and, in accordance with the invention, rather are continuously stirred and recirculated in a closed recirculation loop to a spray device (25). The particles, upon being recirculated, will grow to form a granulate which, eventually, will deposit, the granulate, however, being constituted by granules substantially in excess of those which form a mud; the larger granules also prevent deposition of encrustations along the walls, and, for example, a pH sensor (47). The washing liquid within the tank or vessel 11 can be held in continuous turbulence or agitated form by a stirrer (53) coupled for example to the shaft of an immersion pump (21), an additional stirrer, by a recirculating fluid injection nozzle (57) or by directing run-off sprayed water into the tank by a direction and collection vane (28). Preferably, oxygen is excluded from the gases to prevent the formation of sulfates, and the washing liquid is held at a temperature below 40° C. by a suitable heat exchanger which can supply hot utility water. A preferred pH is between 6 to 6.5.

6 Claims, 1 Drawing Sheet

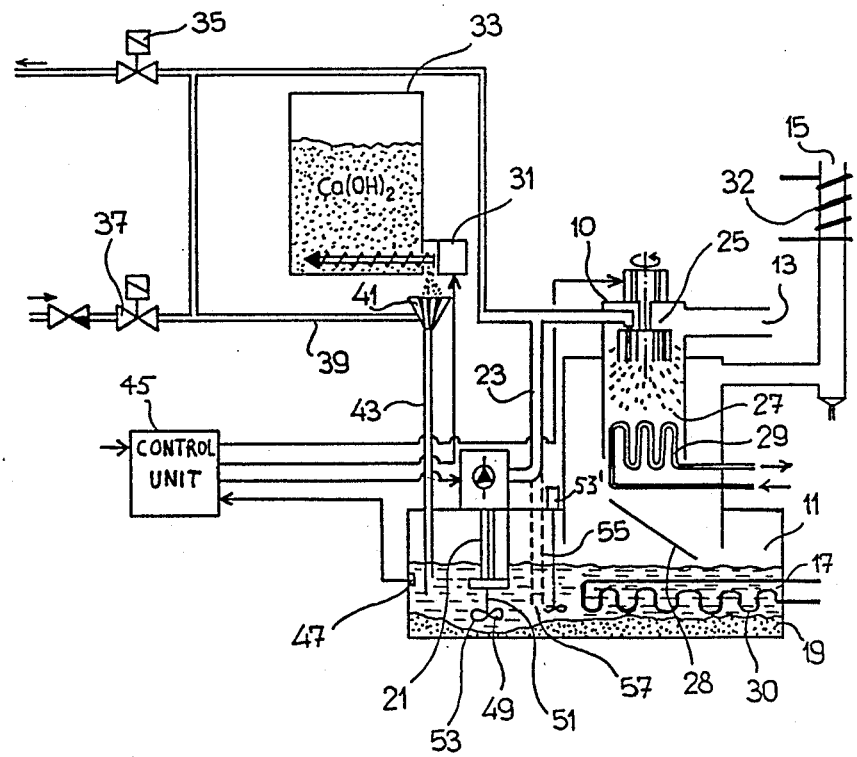

METHOD FOR SEPARATION OF SULFUR DIOXIDE FROM GASES

BACKGROUND

Various processes are known to clean exhaust gases from combustion or burner installations; European Patent Application 0 118 017, Kroll et al, describes a gas cleaning apparatus to generate a spray, and in which a heat exchanger is provided. A cleaning liquid is circulated in a circulation loop to generate the spray. A neutralization substance, for example washing soda or sodium carbonate, is added to the liquid through a valve. Sulfur dioxide which is contained within the flue gases forms a sulfate in the liquid. The sulfate is a mud-like precipitate, which is removed from the bottom of a settling tank or vessel by suction, dried in a drying chamber, and removed from time to time. Turbulence of the precipitated material by a shaft penetrating into the bath is prevented by providing a shielding wall within the settling tank or vessel. This, however, does not prevent fine mud particles from being carried along in the circulation loop circulating the liquid; the particles which are carried along are tiny and represent, by weight, only a minor fraction of the overall circulated quantity. Any slightly larger solid particles are precipitated and permitted to settle out.

Encrustations result when alkaline earth compounds are used as neutralization substances. These encrustations interfere with the proper operation of the flue gas cleaning apparatus after relatively short time intervals.

The referenced article Catalog No. B 18 655 in the Swiss Federal Technological University, discusses the effect of pH values when cleaning flue gases, and points out that the pH values are of substantial importance. Highly alkaline solutions would be best suited to remove $SO_2$ from flue gases. It has been found, however, that at a pH value of more than 8, $CO_2$ which is present in flue gases in substantial excess is undesirably highly accepted by the neutralization substances, so that the quantity of neutralization substance required increases excessively. The article mentions that a suitable range for $SO_2$ absorption is a pH value of from about 5 to 7.5. Direct absorption of $SO_2$ with alkaline earth compounds $Ca(OH)_2$, $CaCO_3$, $Mg(OH)_2$) has substantial problems, as referred to on page 16 of the literature reference. The reason appears to be that, almost exclusively, suspensions are involved, resulting in substantial danger of formation of encrustations. This is one of the worst problems of the first generation of processes in this field. The danger of encrustation is particularly high when using lime as a neutralization substance, as referred to on page 17 of the cited literature, so high that counter-flow absorption appears to be impossible. The separation degree is only up to about 90%. An advantage of using lime, however, is the low price of the alkaline earth absorbing material and that the resulting end products could be readily disposed of, for example in fills, or may even have sales value.

The Attisholz-Sulzer recycling process, described in the "Technical Review Sulzer", January 1987, page 22, article by Gage et al, describes a process in which a suspension of calcium carbonate and washing liquid is used. This suspension is pumped to the head of a column and flows in counter-flow direction with respect to the flue gases over a packing in the column. The calcium carbonate reacts with the sulfur dioxide and is converted to calcium sulfite and, partially, to water-soluble calcium bisulfite. Formation of sulfite in the absorption column results in increasing encrustation of the packing of the column. For a continuously operating system, two such columnar plants are necessary. This permits operating one column while flushing or rinsing or purging the other one. Any one column can operate for about 100 hours before requiring flushing or purging.

THE INVENTION

It is an object to provide a method to separate sulfur dioxide from gases, particularly from combustion exhaust gases such as flue gases, in which alkaline earth compounds are used as neutralization substances without, however, resulting in encrustations as the process is carried out; and to provide an apparatus to carry out such a process.

Briefly, it has been discovered, in accordance with the invention, that solid particles which form during washing of the gas should be continuously recirculated, rather than, as in the prior art, permitting solid particles to settle out in a settling tank or the like. In contrast to the prior art in which it was intended to prevent recirculation of solid particles, the present invention specifically requires recirculation of solid particles, which includes even relatively large solid particles. It has been discovered, entirely unexpectedly and surprisingly, that thereby encrustations are avoided and that any encrustations which may have occurred are removed. Upon continued recirculation of the washing liquid with the solid particles therein, the solid particles grow until they reach a size in which they will precipitate inherently, for example due to the weight, leaving a granular sediment. This granular sediment, in contrast to the muddy sediment obtained in settling tanks, has the additional advantage that it can be easily dehydrated.

The quantity of absorption substance which is used can be reduced if the gas to be cleaned has no or only very little oxygen. It is thus desirable to so control the combustion generating burner system that only little excess air is present. The flue gas connection from the burner unit to the gas cleaning system should be airtight, and leakage of air to the combustion exhaust gases to be cleaned should be prevented. The gas to be treated, if it is practically free of oxygen, will result in primary formation of sulfites, rather than sulfates. This can be seen by a decoloration of the washing liquid to have a milky appearance. The quantity of neutralization substance which is then needed is less than if oxygen is present and, still, no encrustations or deposits on the washing tower or washing apparatus will result.

To prevent settling of solid particles, so that the solid particles will continue to be recirculated, it is desirable to stir at least a portion of the content of a washing liquid retaining vessel. The result in turbulence will then prevent precipitation of solid particles, particularly of the substantially large ones. Further, stirring the tank prevents settling out, for example after the washing system or a burner has been shut down for some time, and, upon restarting, solid particles are immediately introduced into the closed cycle by stirring of the liquid in the supply tank. This ensures that the washing liquid which is circulated will always carry along a substantial proportion of solid particles.

In accordance with a preferred feature of the invention, a suitable pH range is between 5 to 6.8; experiments have shown that the process in accordance with the present invention is preferably carried out in pH ranges of from 6 to 6.5. In contrast to the discussion in the Technical University article, a pH value of about 6.8 already leads to relatively high precipitations due to $CO_2$, leading to the formation of calcium carbonate.

In accordance with a feature of the invention, and in a preferred method, the temperatures of the washing liquid should be relatively low. Self-cleaning effects are better when the temperature decreases. Preferably, the temperature of the washing liquid is held at below 60° C., and most desirably in a temperature range of from between about 0° to 40° C. Usually, heating systems do not permit washing liquids in a closed loop to operate at temperatures below 35° C., unless the washing liquid is used also to pre-heat utility water supplies, or additional cooling is provided, for example by a heat exchanger in ambient atmosphere, or buried in the ground.

The alkaline earth compound used is, preferably, slaked or unslaked lime. This absorption substance is cheap and the end products can be easily deposited in a landfill or may even be saleable.

Solid particles can be added to the system from a washing liquid which already contains sediments from some other washing apparatus or system. This prevents formation of initial encrustation. It is especially important to avoid encrustations on a pH sensor since any encrustations on the sensor may interfere with proper operation of the system, in that the pH values will not be accurately indicated. Avoiding encrustations, and particularly on a pH sensor, by pre-supplying sediments to the washing liquid ensures that the system operates properly and without building up encrustations immediately upon start-up.

In accordance with a feature of the invention, an apparatus to carry out the method is provided which includes a spraying system to generate a drizzle or spray rain, a pump to supply washing liquid to generate the spray rain, and a vessel to receive a supply of the washing liquid. In accordance with a feature of the invention, and to ensure that in the circulating loop there will always be some solid particles so that deposits can grow thereon, the system includes arrangements to generate turbulence and for stirring up the liquid which is being circulated, so that solid particles will be within the circulating loop. This ensures that the washing liquid always contains sufficient solid particles, in order to prevent encrustations.

In accordance with a preferred embodiment of the invention, the pump is a submerged or submersible pump. Submersible pumps are preferred since they are highly reliable in operation. Additionally, use of a submersible pump ensures that the apparatus can operate essentially without service supervision due to the inherent reliability of the system. In accordance with another feature, and which is preferred in the apparatus, is a device to stir the liquid in the supply tank, so that the solid particles will be circulated in the circulation loop by, for example, extending the rotor shaft of the submersible pump and coupling a stirrer to the shaft, for example in form of an impeller or propeller. Such a stirrer stirs the washing liquid in the supply vessel, thereby preventing deposition or precipitation of solid particles or, for example after the system has been shut down, to again stir up particles which may have precipitated to the bottom of the supply tank or vessel.

In accordance with another feature of the invention, and used additionally, or instead of the stirrer, it is possible to use deflection vanes or deflection shields which collect the water from the drizzle or spray rain and so direct it into a washing liquid vessel that the water will be introduced under high turbulence and to thereby ensure circulating the liquid in the circulation loop with solid particles therein. The water in the supply tank or vessel can also be stirred or placed in motion to prevent precipitation of solid particles in other ways, for example by connecting a line from the pressure side of the pump to a nozzle located within the washing liquid supply tank and eject a stream of water from the nozzle to stir the water therein and prevent deposition of solid particles, and/or to stir up the solid particles for recirculation. Of course, rather than coupling a stirrer to the pump rotor, separate stirrers to stir up and recirculate solid particles can be used. If a separate stirrer is provided, the recirculation of washing liquid in the recirculation loop can be comparatively slow. The combination of a stirrer with a submersible pump is probably the most economical way of maintaining solid particlels suspended in the recirculating liquid.

In accordance with a feature of the invention, a heat exchanger is coupled in the recirculating loop in order to maintain the washing liquid at a relatively low temperature. The heat exchanger can exchange heat with return water from a heating plant, so that the return water is pre-heated before it is introduced into a boiler. Condensation heat may also be utilized which, in oil-fired burners, is about 6.5%, and in gas-fired burners about 10%. It has been found suitable to expose the heat exchanger to the water spray, which will not result in encrustations.

An additional heat exchanger can be used to further cool the wash water, for example for pre-heating utility water supplies, for example for washing or hot-water supplies to a building.

Preferably, the cleaning system is enclosed within an effectively gas-tight housing. This has the advantage that access of air, which is undesirable, is prevented and ensures that the alkaline earth will provide for conversion to a high percentage of sulfites.

The exhaust gases to be treated, preferably, are conducted through and/or away from the system by a fan or blower. The use of a fan has the advantage that the cleaned flue or exhaust gases need not be re-heated in order to permit them to be exhausted through a smoke stack or the like. It is particularly desirable to so arrange the fan that it can have additional functions, for example to function simultaneously as a spray device and for recirculation of gases within the system.

DRAWINGS

The single FIGURE illustrates, highly schematically, a system for removing sulfur from flue exhaust gases.

DETAILED DESCRIPTION

An effectively gas-tight housing 10 is shaped to define a vessel or container 11 at the bottom thereof for gas washing liquid. The housing 10 has a gas inlet 13 and a gas outlet 15. The vessel 11 is used as a supply vessel for the washing liquid 17, as well as a reception container for the solid end products 19 which will accumulate upon cleaning of the exhaust gases. A submersible or immersion pump 21 recirculates the washing liquid. This can be a pump which rotates comparatively slowly, so that the danger or erosion of rotary components, which may be due to solid particles within the washing liquid, is minimized. The washing liquid is supplied by the pump 21 over a line 23 to a sprayer 25, to be broken up into a spray or mist. The spray distributor 25 is located within a chamber or space 27 within which the gases to be cleaned are mixed intimately with the spray or mist. A heat exchanger 29 is located within the space 27. Heat exchanger 29 may, for example, receive return flow from a heating system, in advance of being supplied again to a boiler. The heat exchanger 29 can be used in addition to and coupled to a further heat exchanger 30 located within the vessel 11. The heat exchanger 30 is used to further cool the washing liquid. Yet, a third heat exchanger 32 can be used, to cool the flue gases. The respective heat exchangers 30, 32 can be used, for example, to heat utility water, for example for warm-water supply to a building.

A supply system 31 provides metered quantities of absorption substance from an absorption supply container 33 to the washing liquid within the vessel 11.

A valve 35 is provided to draw samples. A valve 37 admits fresh water to the system. Line 39 flushes absorption substance from a funnel 41 through line 43 into the vessel 11.

A control 29 45 is provided for energization of the pump 21 and of the spray device 25, coupled for example to a burner, to energize the system when the burner is burning fuel. A pH sensor 47 determines if the washing liquid 17 has the desired pH value. If it drops below a predetermined limit, control unit 45 energizes the metering system 31 to add further alkaline substance from container 33 to the washing liquid.

U.S. Pat. No. 4,684,940, by the inventor hereof, describes a similar cleaning system in greater detail; the disclosure of this patent is hereby incorporated by reference.

In accordance with the invention, the washing liquid within the container 11 is continuously stirred or held in a state of turbulence so that the liquid which is being recirculated through duct 23 will contain solid particles; vessel 11, thus, is not a settling or quieting tank but, rather, merely a container in which the liquid is in constant motion, and in which settling out of tiny particles, or mud is effectively prevented.

In accordance with a feature of the invention, a device 49 to stir and recycle solid particles is provided. In the example shown, this device is constructed as a prolongation 51 of the rotor of the pump 21 and a stirrer 53 located on the extension or prolongation of the pump rotor, for example in form of an impeller or propeller. It is, of course, equally possible to provide a special separate stirrer 53', driven by its own motor, located elsewhere within the vessel 11. The additional stirrer 53' may run at a speed different from that of the pump 21, or a stirrer can be driven from the pump motor 21 via a separate drive, such as a belt, gear transmission or the like. In essence, it is the function of the stirrer 53 to prevent precipitation and deposition of solid particles when the washing apparatus is in use or, after shutdown, for example during periods of time when the burner is inoperative, and then re-started, to introduce solid particles which may have precipitated out into the recirculating loop, by stirring particles which are being sucked up by the suction pump from the bottom of the tank. In accordance with a feature of the invention, a separate stirrer 53', or the stirrer of the pump, can be maintained in continuous operation in order to prevent precipitation of solid particles if the burner should be OFF for comparatively long periods of time. Carrying along solid particles in the liquid prevents encrustations. It is of specific importance to prevent encrustations on the pH sensor 47, since such encrustations may interfere with proper sensing operation of the sensor.

Experiment I—Prior Art.

The system as described, but without the stirrer 49, or the additional stirrer 53', was set in operation. In addition to the system shown, a filter was introduced in the washing liquid loop to continuously filter the liquid. Surprisingly, the degree of encrustation increased as the liquid became clearer, that is, as the filter removed solid particles from the washing liquid. A crystallization layer on the heat exchanger 29 was clearly visible after 10 hours of operation.

Experiment II—Present Invention.

The filter was removed and, instead, stirrer 53 was coupled to an extension 51 of the immersion pump rotor. The stirrer stirred up any solid particles within the liquid 17, and all these slid particles were introduced into the circulating loop. It was found that the crystallization layer on the surfaces of the heat exchanger 29 and on other surfaces of the system previously present after the Experiment I were actually removed and that the surfaces were clean and blank after only a few hours of operation.

The reason for cleaning and removal of encrustations is not completely understood; yet, as the Experiment II has shown, it is believed that the cleaning effect and the prevention of encrustation is due to the following; this, of course, is a theory.

When using calcium hydroxide as an absorption substance, solube and dissolved salts will result due to combination with sulfur dioxide. When these salts are forced to circulate in the circulating loop, the respective crystals will grow. This appears to be the decisive factor which prevents encrustations. It appears that, as the crystals are carried along with the washing liquid, a process is started which prevents the deposition of a crystallization layer on the heat exchanger and/or on other surfaces of the apparatus. The crystals which are in circlation react on their surfaces with the washing liquid and they thereby grow until they reach a size at which they will necessarily precipitate. It is possible that small crystals may re-dissolve.

The processes of the Experiments I and II were carried out with temperatures of the washing liquid of between 35° to 40° C. When the temperature was increased, already present deposits were not removed as quickly as with lower temperatures.

According to experiments, it was found that the most desirable pH value was between 6 to 6.5. At values below 5, the cleaning effect is too low; at values over 6.8, absorption of $CO_2$ increases to an undesired level.

The gas to be cleaned should contain no or only very little oxygen, so that the washing liquid will, preferably, form only sulfites. These sulfites can be observed by a milky decoloration of the washing liquid. The milky discoloration shows that in sulfites the particle size is very small.

The precipitate 19, which is essentially granular, had the following composition:

| | |
|---|---|
| dry residue to 105° C. | 290 g/kg |
| water content | 710 g/kg |
| calcium carbonate ($CaCO_3$) | 27.5 g/kg |
| calcium sulfite ($CaSO_3$) | 53.6 g/kg |
| calcium sulfate ($CaSO_4$) | 126.0 g/kg |
| calcium nitrite ($Ca(NO_2)_2$) | 0.032 mg/kg |

| -continued | |
| --- | --- |
| calcium nitrate (Ca(NO$_3$)$_2$) | 0.77 mg/kg |
| spec. gravity | 1.275 kg/l |

Respective operating parameters during the process influence the process itself, such as pH value, temperature, absence or presence of oxygen from the gas or the like. Of particular interest is the absence or lack of oxygen with respect to the formation of sulfite. Upon the formation of bisulfite, the use of absorption substance decreases and fewer solid particles will occur which, then, must be removed. When bisulfite is formed, one metal atom binds double the number of sulfur atoms as is the case with sulfate. It is believed that the dissolved bisulfite forms a solvent accelerator to dissolve encrustations.

Various changes and modifications of the apparatus and of the method may be used. For example, the solid particles can be stirred or re-suspended in the washing liquid 17 by other arrangements than by a stirrer 53 or 53'. Preferably in addition to the stirrers, but possibly in replacement thereof, and therefore shown in broken lines, a line 55 can extend from the pressure side of the pump 21 into the liquid 17, terminating in a nozzle 57 which stirs up any solid particles which may have dropped to the bottom of the vessel 11. Additionally, or instead of the stirrer 53 and/or the nozzle 57, a deflection shield 28 can be located beneath the space 27 to collect the water from the drizzle or spray and so direct it into the vessel 11 that it will impinge as a stream on the liquid 17 which stirs and recirculates solid particles within the liquid in the vessel 11.

Various other changes and modifications may be made within the scope of the inventive concept.

As an additional theory, it may be belived that solid particles which are carried in the recirculating loop, and which are distributed as a fine spray by the distributor 25, act similar to seed crystals which, then, will grow, similar to fine dust particles which can grow to hail stones under appropriate conditions. The thus grown crystals or moving seed particles may have a scouring effect on already encrusted particles and, since solvent is also present, upon scouring, accumulate additional then dissolved encrusted material, to further grow, and so on.

I claim:

1. Method of separating sulfur dioxide from gases, particularly combustion exhaust gases and flue gases, comprising the steps of
   in an effectively gas-tight housing (10),
   contacting the gases which are free, or essentially free, of oxygen with a washing liquid which contains an alkaline earth compound, while effectively excluding oxygen from said gases, whereby, upon chemical reaction between the gases and said washing liquid, solid particles will be formed;
   circulating, together with the washing liquid, solid particles formed in the washing liquid upon contacting of the gases with the alkaline earth compound containing washing liquid;
   maintaining the washing liquid at a pH value in the range of from 6 to 6.8; and
   maintaining the washing liquid at a temperature of between 0° to 40° C.

2. The method of claim 1, wherein the circulating step includes the step of retaining the washing liquid in a tank or vessel portion (11) of said housing (10);
   and further including the step of causing turbulence or movement within the liquid in the vessel and inhibiting deposition or precipitation of solid particles within the vessel to provide for recirculation of the liquid with the solid particles from the vessel.

3. The method of claim 2, further including the step of introducing turbulence or stirring of liquid in the vessel upon first starting said circulating step and optionally after interruption of said circulating step.

4. The method of claim 1, wherein the washing liquid is maintained with a pH value in the range of from about 6 to 6.5.

5. The method of claim 1, wherein said earth alkaline compound comprises slaked or unslaked lime.

6. The method of claim 1, including the step of introducing solid particles formed upon contacting of the gases with an earth alkaline containing washing liquid into the washing liquid prior to first commencing carrying out the method of claim 1.

* * * * *